(12) United States Patent
Naik et al.

(10) Patent No.: US 11,686,473 B2
(45) Date of Patent: Jun. 27, 2023

(54) COMBUSTION LINER

(71) Applicant: General Electric Company, Schenectady, NY (US)

(72) Inventors: Pradeep Naik, Bengaluru (IN); Shai Birmaher, Cincinnati, OH (US); Saket Singh, Bengaluru (IN); Krishnendu Chakraborty, Bengaluru (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/663,103

(22) Filed: May 12, 2022

(65) Prior Publication Data

US 2023/0143185 A1 May 11, 2023

(30) Foreign Application Priority Data

Nov. 11, 2021 (IN) .............................. 202111051753

(51) Int. Cl.
*F23R 3/06* (2006.01)
*F23R 3/04* (2006.01)
*F23R 3/00* (2006.01)

(52) U.S. Cl.
CPC ................ *F23R 3/06* (2013.01); *F23R 3/002* (2013.01); *F23R 3/045* (2013.01); *F23R 2900/03043* (2013.01)

(58) Field of Classification Search
CPC .. F23R 3/002; F23R 3/045; F23R 3/06; F23R 3/16; F23R 3/44; F23R 3/46; F23R 3/50;
(Continued)

(56) References Cited

U.S. PATENT DOCUMENTS

| 7,654,089 | B2 | 2/2010 | Schilling et al. |
| 9,010,123 | B2 | 4/2015 | Rudrapatna et al. |

(Continued)

FOREIGN PATENT DOCUMENTS

GB 2512642 A 10/2014

OTHER PUBLICATIONS

Naik et al., U.S. Appl. No. 17/340,585, filed Jun. 7, 2021.
(Continued)

*Primary Examiner* — Scott J Walthour
(74) *Attorney, Agent, or Firm* — Venable LLP; Elizabeth C. G. Gitlin; Michele V. Frank

(57) ABSTRACT

A liner for a combustor in a gas turbine engine and a related method. The liner includes a liner body having a cold side and a hot side. The liner includes a dilution array having a plurality of dilution passages, each dilution passage of the plurality of dilution passages having a concatenated geometry repeating in a predetermined pattern and extending circumferentially around the liner body. The dilution passage integrates a first dilution air flow flowing through the dilution passage from the cold side to the hot side and a second dilution air flow flowing through the dilution passage from the cold side to the hot side into an integrated dilution air flow and injects the integrated dilution air flow into a core primary combustion zone of the combustor to attain a predetermined combustion state of the combustor. The dilution array is repeated along an axial length of the liner body.

20 Claims, 10 Drawing Sheets

(58) Field of Classification Search
CPC .............. F23R 3/54; F23R 2900/03043; F23R 2900/03282
See application file for complete search history.

(56) References Cited

U.S. PATENT DOCUMENTS

| | | |
|---|---|---|
| 9,038,395 B2 | 5/2015 | Rudrapatna et al. |
| 9,328,665 B2 | 5/2016 | Doerr et al. |
| 9,416,971 B2 | 8/2016 | Xu |
| 10,301,964 B2 | 5/2019 | Spangler et al. |
| 10,330,319 B2 | 6/2019 | Duesing et al. |
| 10,378,774 B2 | 8/2019 | Hu et al. |
| 10,386,070 B2 | 8/2019 | Sandoval et al. |
| 10,533,746 B2 | 1/2020 | Rimmer et al. |
| 10,684,017 B2 | 6/2020 | Moura et al. |
| 2002/0189260 A1* | 12/2002 | David ................... F23R 3/045 60/746 |

OTHER PUBLICATIONS

Sampath et al., U.S. Appl. No. 17/340,856, filed Jun. 7, 2021.
Ganiger et al., U.S. Appl. No. 17/340,654, filed Jun. 7, 2021.
Ganiger et al., U.S. Appl. No. 17/340,703, filed Jun. 7, 2021.
Ganiger et al., U.S. Appl. No. 17/340,764, filed Jun. 7, 2021.
Ganiger et al., U.S. Appl. No. 17/340,816, filed Jun. 7, 2021.
Naik et al., U.S. Appl. No. 17/663,093, filed May 12, 2022.
Naik et al., U.S. Appl. No. 17/663,095, filed May 12, 2022.
Naik et al., U.S. Appl. No. 17/663,098, filed May 12, 2022.

* cited by examiner

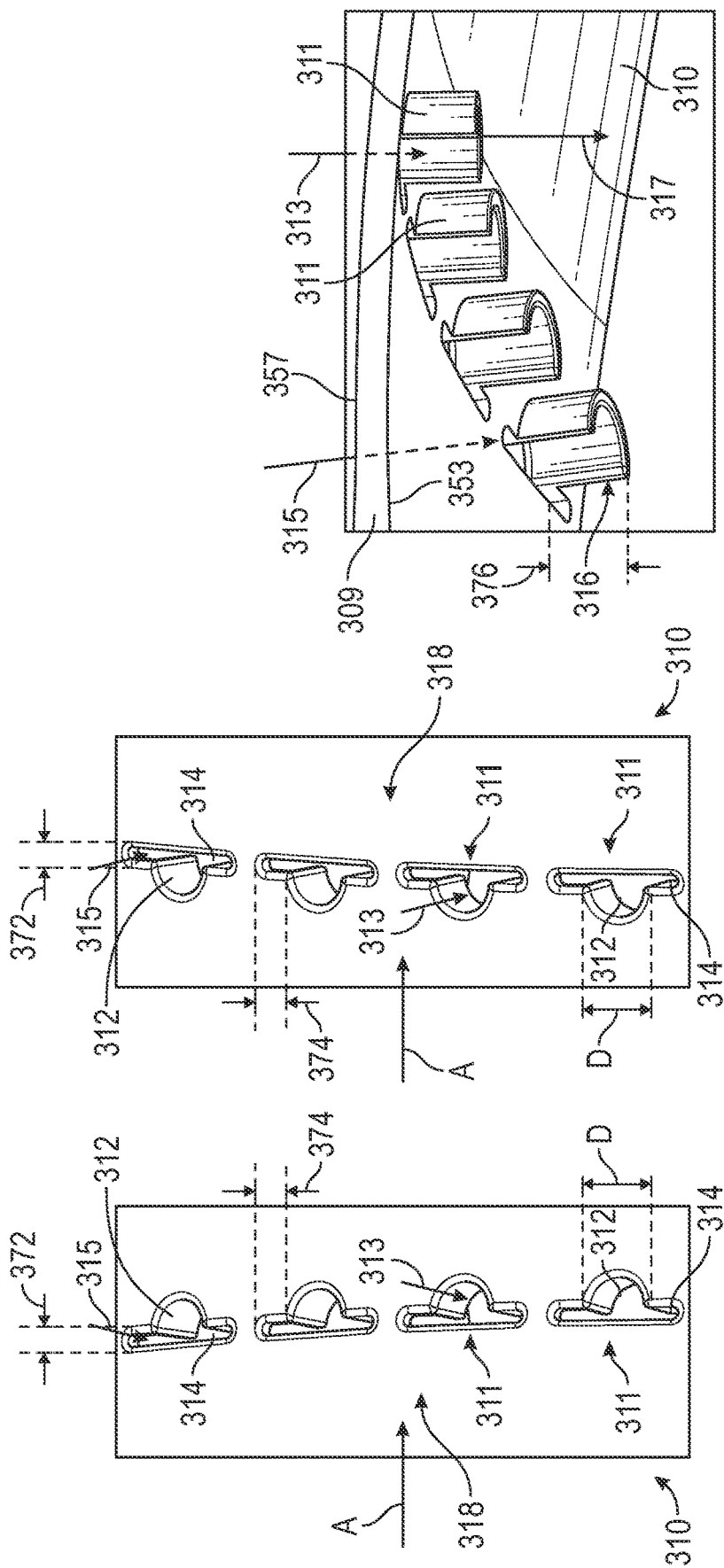

COMBUSTION LINER

CROSS REFERENCE TO RELATED APPLICATIONS

The present application claims the benefit of Indian Patent Application No. 202111051753, filed on Nov. 11, 2021, which is hereby incorporated by reference herein in its entirety.

TECHNICAL FIELD

The present disclosure relates to a combustion liner. In particular, the present disclosure relates to a combustion liner for a combustor in a gas turbine engine, the liner having dilution openings and passages around the dilution openings.

BACKGROUND

A gas turbine engine includes a combustion section having a combustor that generates combustion gases that are discharged into the turbine section of the engine. The combustion section includes a combustion liner. Current combustion liners include dilution openings in the liner. The dilution openings provide dilution air flow to the combustor. The dilution air flow mixes with primary zone products within the combustor.

BRIEF DESCRIPTION OF THE DRAWINGS

Features and advantages will be apparent from the following description of various exemplary embodiments, as illustrated in the accompanying drawings, wherein like reference numbers generally indicate identical, functionally similar, and/or structurally similar elements.

FIG. 6A shows a schematic, partial, top perspective view of a dilution passage of a liner for a combustor, according to an embodiment of the present disclosure.

FIG. 6B shows a schematic, partial, top perspective view of a dilution passage of a liner for a combustor, according to an embodiment the present disclosure.

FIG. 7A shows a schematic, partial, bottom perspective view of the dilution passage of the liner of FIG. 6A, according to an embodiment of the present disclosure.

DETAILED DESCRIPTION

Figure 1:
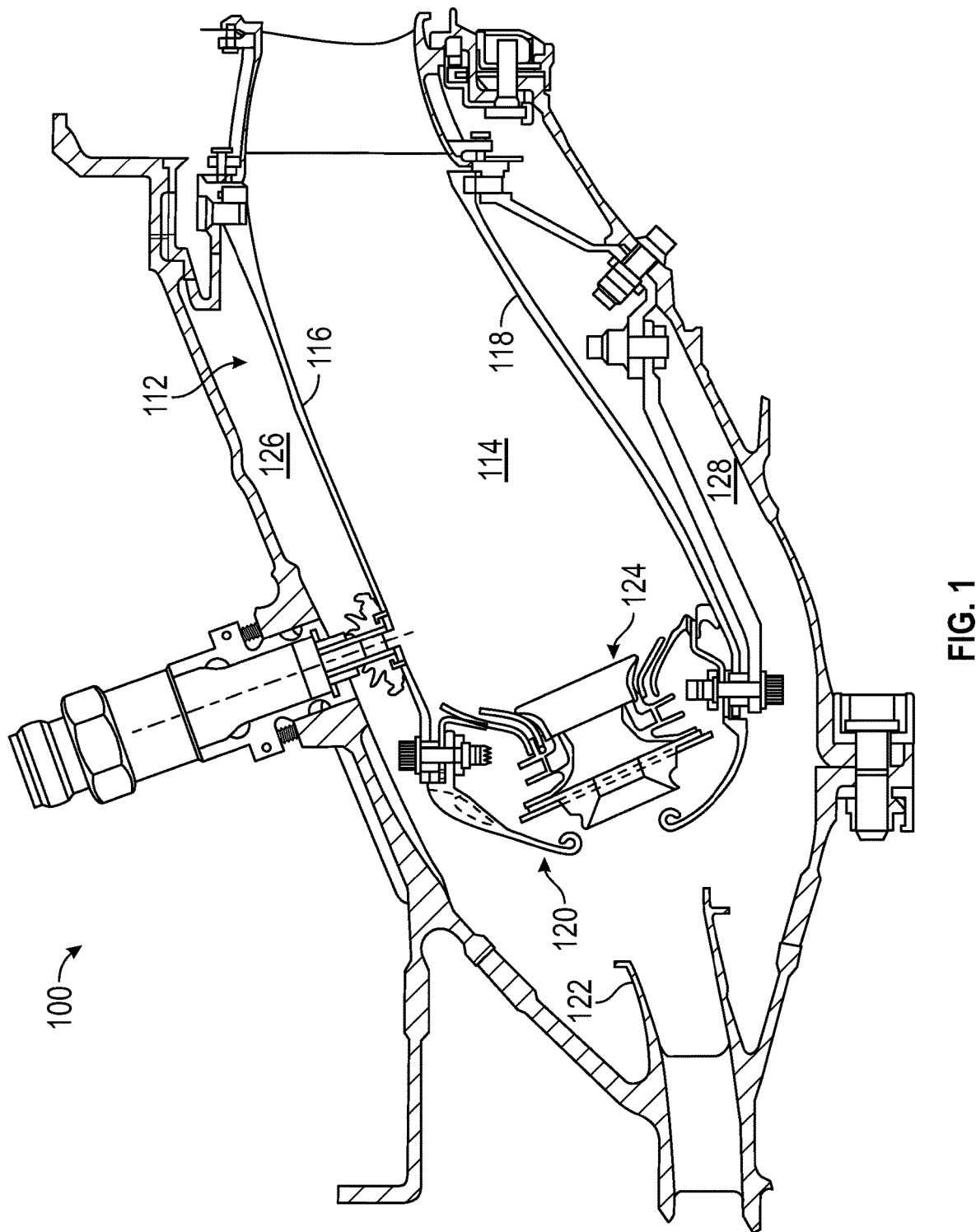
FIG. 1 shows a schematic, cross-sectional view of a combustion section of a gas turbine engine, according to an embodiment of the present disclosure.

Features, advantages, and embodiments of the present disclosure are set forth or apparent from a consideration of the following detailed description, drawings, and claims. Moreover, it is to be understood that the following detailed description are exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and scope of the present disclosure.

Reference will now be made in detail to present embodiments of the disclosed subject matter, one or more examples of which are illustrated in the accompanying drawings. The detailed description uses numerical and letter designations to refer to features in the drawings. Like or similar designations in the drawings and description have been used to refer to like or similar parts of the disclosed subject matter. As used herein, the terms "first," "second," "third", "fourth," and "exemplary" may be used interchangeably to distinguish one component from another and are not intended to signify location or importance of the individual components.

The terms "upstream" or "forward" and "downstream" or "aft" refer to the relative direction with respect to fluid flow in a fluid pathway. For example, "upstream" refers to the direction from which the fluid flows, and "downstream" refers to the direction to which the fluid flows. For example, "forward" refers to a front end or direction of the engine and "aft" refers to a rear end or direction of the engine.

Gas turbine engines, such as those used to power aircrafts or industrial applications, include a compressor, a combustor, and a turbine, disposed about a central engine axis, with the compressor disposed axially upstream of the combustor and the turbine disposed axially downstream of the combustor. The compressor pressurizes a supply of air, the combustor burns a hydrocarbon fuel in the presence of the pressurized air, and the turbine extracts energy from the resultant combustion gases. Air pressure ratio and/or exit temperature of a combustor can be changed to improve gas turbine engine-cycle efficiencies. Further, any change in the air pressure ratio and/or exit temperature of a combustor can impact the operability and the life of the turbine. Combustor exit temperatures above 1100° C. are now common in gas turbine engines while acceptable metal temperatures for the stationary nozzles and rotating blades of a turbine are still limited to 900° C. or 1000° C. Further, the temperature of a turbine blade impacts the mechanical strength of the blade (e.g., creep and fatigue) as well as the oxidation and corrosion resistance of the blade. Maintaining the combustor temperature within an acceptable range can improve the life of the turbine blades and the turbine nozzles considerably. Structurally, combustor liners are provided inside combustors to withstand the extreme thermal loads and extensive combustor liner cooling arrangements are likely to reduce thermal stress in several mechanical parts and components of a gas turbine engine.

In a combustor of a gas turbine engine, air generally flows through an outer passage and an inner passage surrounding a combustor liner. The air flows from an upstream end of the combustor liner to a downstream end of the combustor liner. Some of the air flowing through the outer passage and the inner passage is diverted through a number of dilution holes provided in the combustor liner and into a core primary combustion zone as dilution air. One purpose of the dilution air flow is to cool (i.e., quench) the combustion gases within the core primary combustion zone before the gases enter a turbine section. Quenching of the products of combustion from a core primary combustion zone of a combustor must, however, be done quickly and efficiently so that regions of high temperature are minimized, and, thereby, $NO_x$ emissions from the combustion system are reduced.

Utilizing discrete dilution holes (also referred to as "discrete holes") and discrete dilution slots (also referred to as "discrete slots") through a liner that essentially form flow passages through the liner is known. In a discrete dilution situation, high turbulence is introduced into the core primary combustion zone of a combustor from a number of discrete jets. As a result, good mixing of the combustion products is achieved after dilution. There remains, however, pockets of high temperature regions within the combustor core due to low jet penetration. Further, wake regions formed behind discrete dilution jets and between discrete dilution jets give rise to low cooling and low mixing of the dilution air with the primary combustion products. In annular dilution, on the other hand, jet penetration level is high, but turbulence generated is low resulting in low level mixing of the dilution air with primary zone products post dilution flow entry giving rise to potential higher temperature in the core of the combustor post dilution thereby creating a higher exit temperature profile/pattern and can have a negative impact on combustion efficiency.

The present disclosure provides a way to synergistically combine the advantages of discrete dilution and annular dilution. A combustor includes a liner body having a cold side and a hot side. The liner body includes a dilution passage having a concatenated geometry extending through the liner body. A first dilution air flow and a second dilution air flow pass through the dilution passage from the cold side of the combustion liner to the hot side of the combustor liner. The dilution passage integrates the first dilution air flow and the second dilution air flow within the concatenated geometry into an integrated dilution air flow and injects the integrated dilution air flow into a core primary combustion zone of a combustor to attain a predetermined combustion state of the combustor.

FIG. 1 shows a schematic, cross-sectional view of a combustion section 100 of a gas turbine engine, according to an embodiment of the present disclosure. The combustion section 100 includes a combustor 112 that generates combustion gases that are discharged into the turbine section (not shown) of the engine. The combustor 112 includes a core primary combustion zone 114. The core primary combustion zone 114 is bound by an outer liner 116, an inner liner 118, and a cowl 120. Additionally, a diffuser 122 is positioned upstream of the core primary combustion zone 114. The diffuser 122 receives an airflow from the compressor section (not shown) of the engine and provides the flow of compressed air to the combustor 112. The diffuser 122 provides the flow of compressed air to cowl 120 of a swirler 124. Air flows through an outer passage 126 and an inner passage 128.

Figure 2:
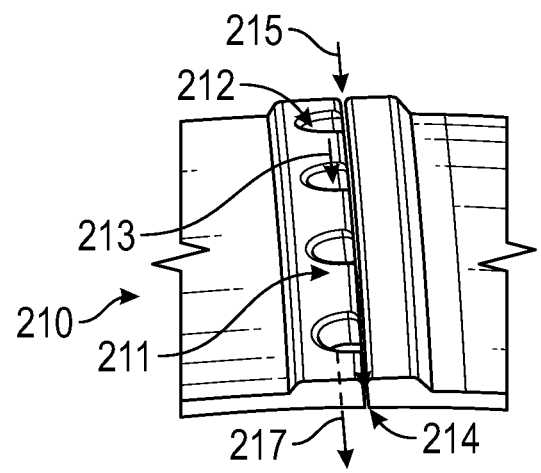
FIG. 2 shows schematic, side perspective view of a dilution passage through a combustion liner for a combustor, according to an embodiment of the present disclosure.
Figure 3:
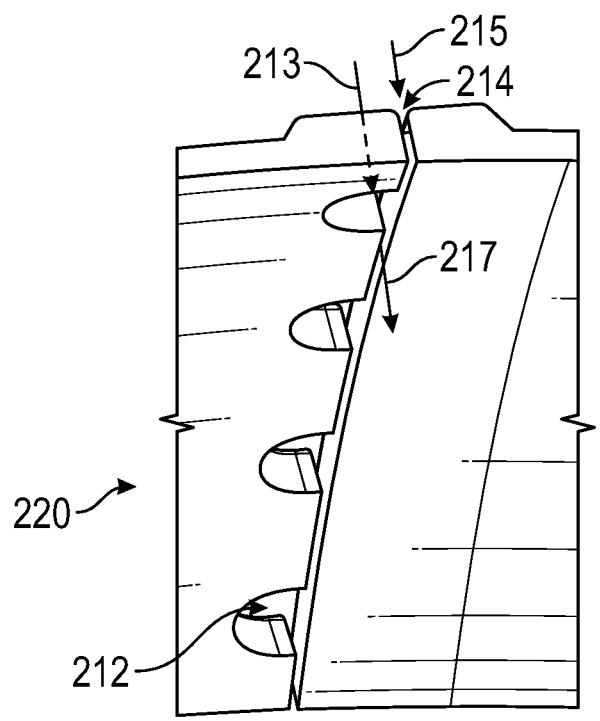
FIG. 3 shows a schematic side view of the dilution passage of the liner of FIG. 2, according to an embodiment of the present disclosure.

FIGS. 2 and 3 are schematic representations of a liner for a combustor, according to an embodiment of the present disclosure. Referring to FIG. 2, a side perspective view 210 schematically represents a dilution passage 211 extending through a combustion liner for a combustor. Referring to FIG. 3, reference numeral 220 indicates a bottom view that shows the dilution passage 211 of FIG. 2. The dilution passage 211 has a geometry that is formed by concatenating (or physically joining two adjacent entities end to end, blending them into one entity) an exemplary first geometry and an exemplary second geometry. Referring to FIGS. 2 and 3, the first geometry, embodied as a number of discrete holes 212, and the second geometry, embodied as an annular slot 214 extending through the combustor liner, are concatenated into the dilution passage 211.

The discrete holes 212 and the annular slot 214 are concatenated at a predetermined relative position. Referring to FIGS. 2 and 3, the discrete holes 212 are positioned forward or upstream and the annular slot 214 positioned aft or downstream The discrete holes 212 have a semi-circular cross section. Although not shown, a bridge structure may connect the discrete holes 212 to the annular slot 214 to allow for control of a dilution gap between the annular slot 214 and the discrete holes 212. The bridge structure may be connected to the aft face of the liner forming the annular slot 214 (e.g., aft face 459 of FIG. 114). In some examples, the bridge structure may be welded to the annular slot 214. The bridge structure may support and control the dilution gap.

A first dilution air flow 213, passing through the discrete holes 212, is integrated with a second dilution air flow 215 passing through the annular slot 214 into an integrated dilution air flow 217, within the concatenated geometry of the dilution passage 211. Further, the integrated dilution air flow 217 is injected into the core primary combustion zone 114 of the combustor 112 of FIG. 1 to attain a predetermined combustion state of the combustor 112.

The integrated dilution air flow 217 improves a number of desired combustion states of the combustor. The second dilution air flow 215 provides a hydraulic support for the first dilution air flow 213, improving jet penetration in the process. The integrated dilution air flow 217 reduces temperature in the core primary combustion zone 114 of the combustor 112 of FIG. 1 and an emission level of nitrogen oxides ($No_x$) is rendered compliant with regulatory guidelines. Further, an air split ratio or a distribution or share of the first dilution air flow 213 and the second dilution air flow 215 in the integrated dilution air flow 217 is adjusted to reduce the temperature in the core primary combustion zone 114. Furthermore, the portion of the second dilution air flow 215 of the integrated dilution air remains closer to the liner around the circumference of the liner and maintains lower liner temperature behind the integrated dilution structure.

The integrated dilution air flow 217 aids in rapid quenching and a quick mixing of the first dilution air flow 213 and the second dilution air flow 215 with a number of combustion products in the core primary combustion zone 114 of the combustor 112. The increased mixing leads to a uniform temperature distribution within the core primary combustion zone 114 of the combustor 112, and, further, to a combustor liner temperature that conforms with a reference combustor liner temperature.

Figure 4:
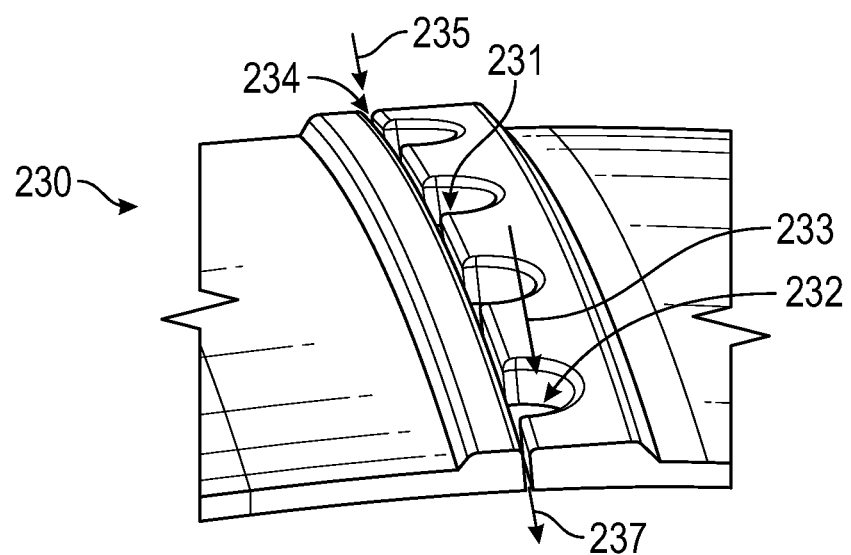
FIG. 4 shows a schematic, side perspective view of a mirrored version of the combustion liner of FIG. 2, according to an embodiment of the present disclosure.

FIG. 4 shows a schematic representation of a mirrored version of the dilution passage 211 of FIG. 2, according to an embodiment of the present disclosure. Referring to FIG. 4, reference numeral 230 indicates a top perspective view that shows a schematic representation of a dilution passage 231 through a combustion liner of a combustor. The dilution passage 231 concatenates a series of discrete holes 232 with an annular slot 234, forward (upstream) from the discrete holes 232. A first dilution air flow 233 passing through discrete holes 232 is integrated with a second dilution air flow 235 passing through the annular slot 234 into an integrated dilution air flow 237, within the concatenated geometry of the dilution passage 231. Further, the integrated dilution air flow is injected into the core primary combustion zone 114 of the combustor 112 of FIG. 1 to attain a predetermined combustion state of the combustor 112.

Figure 5:
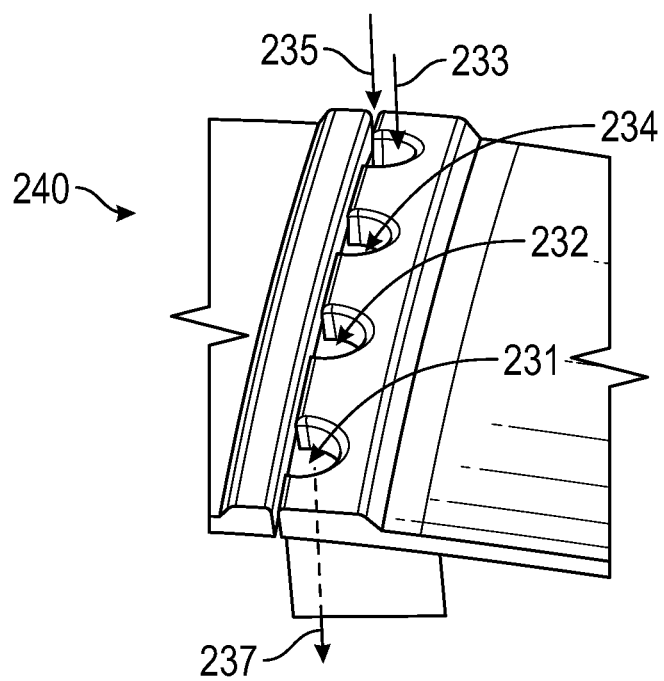
FIG. 5 shows a schematic, side perspective view of the dilution passage of the liner of FIG. 4, according to an embodiment of the present disclosure.

Referring to FIG. 5, reference numeral 240 indicates a side perspective view of the dilution passage 231 of FIG. 4. The first dilution air flow 233 passes through discrete holes 232 and the second dilution air flow 235 passes through the annular slot 234. The second dilution air flow 235 provides a hydraulic shielding for the first dilution air flow 233, improving jet penetration in the process.

Referring to FIGS. 1 to 5, a velocity distribution of combustion products within the core primary combustion zone 114 (FIG. 1) of the combustor 112 (FIG. 1) is improved by integrating the first dilution air flow (213, 233) and the second dilution air flow (215, 235) into the integrated dilution air flow (217, 237), within the dilution passage (211, 231). Specifically, low velocity of combustion products, generally associated with a dilution configuration having only discrete dilution holes, is enhanced by the integration of the first dilution air flow and the second dilution air flow into the integrated dilution air flow within the dilution passage. Further, high penetration of dilution air, generally associated with a dilution configuration having only annular dilution passages, is further enhanced by the integration of the first dilution air flow and the second dilution air flow into the integrated dilution air flow within the dilution passage.

Further, a temperature distribution of combustion products within the core primary combustion zone 114 (FIG. 1) of the combustor 112 (FIG. 1) is improved by integrating the first dilution air flow (213, 233) and the second dilution air flow (215, 235) into the integrated dilution air flow (217, 237), within the dilution passage (211, 231). Specifically, localization of high temperature near an outer periphery of the core primary combustion zone 114 (FIG. 1), generally associated with a dilution configuration having only discrete dilution holes, is reduced by the integration of the first dilution air flow and the second dilution air flow into the integrated dilution air flow within the dilution passage. Further, localization of high temperature near a central portion of the core primary combustion zone 114 (FIG. 1), generally associated with a dilution configuration having only annular dilution passages, is reduced by the integration of the first dilution air flow and the second dilution air flow into the integrated dilution air flow within the dilution passage.

Further, the $NO_x$ emission status within a core primary combustion zone 114 (FIG. 1) in the combustor 112 (FIG. 1) is improved by integrating the first dilution air flow (213, 233) and the second dilution air flow (215, 235) into the integrated dilution air flow (217, 237), within the dilution passage (211, 231). Specifically, high $NO_x$ emission near an outer periphery of the core primary combustion zone 114 (FIG. 1), generally associated with a dilution configuration having only discrete dilution holes, is reduced by the integration of the first dilution air flow and the second dilution air flow into the integrated dilution air flow within the dilution passage. Further, high $NO_x$ emission near a central portion of the core primary combustion zone 114 of FIG. 1, generally associated with a dilution configuration having only annular dilution passages, is reduced by the integration of the first dilution air flow and the second dilution air flow into the integrated dilution air flow within the dilution passage.

FIG. 6A shows a schematic, partial top perspective view of a liner 310. The liner 310 may include a dilution array 318. The dilution array 318 includes a plurality of dilution passages 311. The dilution array 318 concatenates the plurality of dilution passages 311 together. As shown in FIG. 6A, the plurality of dilution passages 311 may be arranged in a linear array. Although a single linear arrangement of the plurality of dilution passages 311 is shown, the linear array may be repeated along the axial length of the liner 310.

Each dilution passage 311 includes a discrete, shaped hole 312, also referred to as a discrete hole 312, with a corresponding slot, embodied as a discrete slot 314. The discrete slot 314 has a slot width 372. Each of the discrete slots 314 may be an elongated slot adjacent to and abutting a respective discrete, shaped hole 312. The discrete slot 314 extends on either side of a perimeter or boundary of the discrete hole 312 and the length of extension on either side, referred to as a slot extension 374, is within a range of 0.5 times to fifteen times the slot width 372. The slot extension 374 may include a first slot extension 374 extending circumferentially in a first direction from a first side of the discrete hole 312 and a second slot extension 374 extending circumferentially in a second direction from a second side of the discrete hole 312. The first direction may oppose the second direction. In this manner, the first slot extension 374 and the second slot extension 374 may extend circumferentially away from each other and away from the discrete hole 312.

A first dilution air flow 313 passing through the discrete holes 312 is integrated with a second dilution air flow 315 passing through the discrete slot 314 to form an integrated dilution air flow 317, comprising both the first dilution air flow 313 and the second dilution air flow 315. The integrated dilution air flow 317 is injected into the core primary combustion zone 114 (FIG. 1) of the combustor 112 (FIG. 1) to attain a predetermined combustion state of the combustor 112 (FIG. 1).

With continued reference to FIG. 6A, the discrete slots 314 may be discrete, forward positioned discrete slots. The discrete, shaped holes 312 may be discrete aft positioned, shaped holes or plain holes. Although shown and described in FIG. 6A with the discrete, shaped holes 312 located aft of the discrete slots 314 (e.g., the discrete, shaped holes 312 downstream of the discrete slots 314), the reverse, as shown in FIG. 6B, is also considered such that the discrete, shaped holes 312 are located forward of the discrete slots 314 on the liner 310 (e.g., the discrete, shaped holes 312 upstream of the discrete slots 314). In FIGS. 6A and 6B, the air flows in the directon A.

The relative location of the discrete, shaped holes 312 and discrete slots 314 may, together, improve a turbulence level in the core primary combustion zone 114 (FIG. 1) within the combustor 112 (FIG. 1). For example, the discrete slot 314 positioned in front of (e.g., forward of or upstream of) the discrete hole 312, also referred to as a discrete dilution hole 312, and extending beyond the discrete holes 312 (e.g., the slot extension 374) provides hydraulic shielding and improves penetration of the dilution air flow into the core primary combustion zone 114 (FIG. 1). Portions of the second dilution air flow 315 from the discrete slot 314 get drawn behind discrete jets that are a portion of the first dilution air flow 313 from the discrete holes 312. This may reduce the temperature behind the jets to reduce $NO_x$ emission. Portions of the second dilution air flow 315 from the discrete slot 314 that extend beyond the discrete holes 312 may reduce the temperature between adjacent discrete jets of the first dilution air flow 313 from the discrete holes 312 (e.g., discrete holes 312 located next to each other on the liner 310 with no intervening discrete holes 312).

FIG. 7A shows a partial, bottom perspective view of the dilution array 318 of the liner 310 having of FIG. 6A. The liner 310 has a liner body 309 having a hot side 353 and a cold side 357. Each of the plurality of dilution passages 311 includes protruding dilution inserts 316. The dilution inserts 316 are full-length dilution inserts with a same weighted area extending from a forward side of the dilution insert 316 to an aft side of the dilution insert 316. That is, the dilution inserts 316 have a uniform height 376 (e.g., a height of the dilution insert 316 on the hot side of the liner 310) from the forward side to the aft side. In some examples, the height 376 of the dilution insert 316 may be tapered, for example, may be zero at the forward side and the length can progressively increase to a full length at the aft side of the dilution insert. In some examples, the height 376 of the dilution insert 316 may be within 0.1 times to ten times a diameter D (FIG. 6A) of the discrete holes 312 (FIG. 6A). As shown in FIG. 7A, the first dilution air flow 313 and the second dilution air flow 315 may combine to form the integrated dilution air flow 317.

Figure 7B:
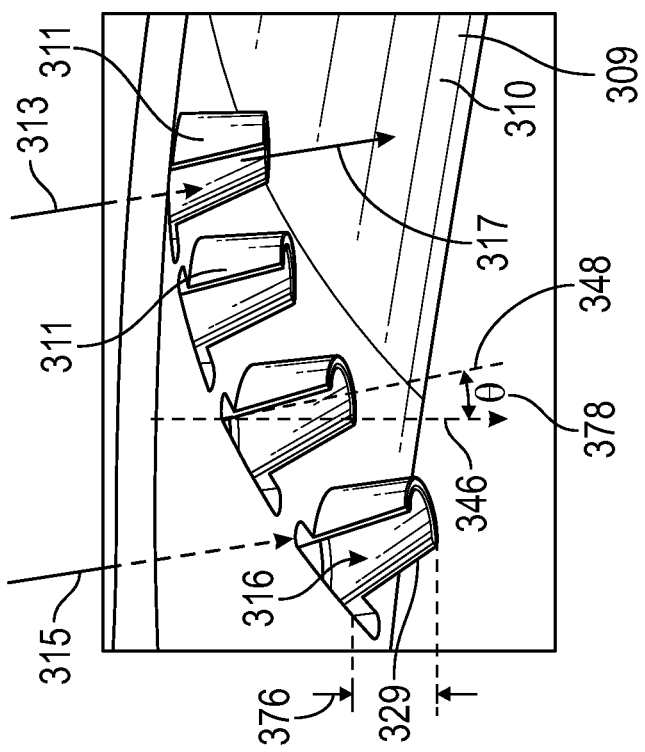
FIG. 7B shows a schematic, partial, bottom perspective view of the dilution passage of the liner of FIG. 6A, according to an embodiment of the present disclosure.

In the example of FIG. 7B, the dilution insert 316 extending from the liner body 309 may include a slant cut 329 on the hot side of the dilution insert 316 such that the height varies from the forward side toward the aft side. The slant cut 329 may be made at an angle theta 378. Angle theta 378 is defined to be the angle between a discrete dilution center axis 346 and an angled cutting plane 348. The angle cutting plane 348 may be aligned with the slant cut 329. The value of the angle theta 378 can vary from zero degree to eighty degrees.

Figure 8:
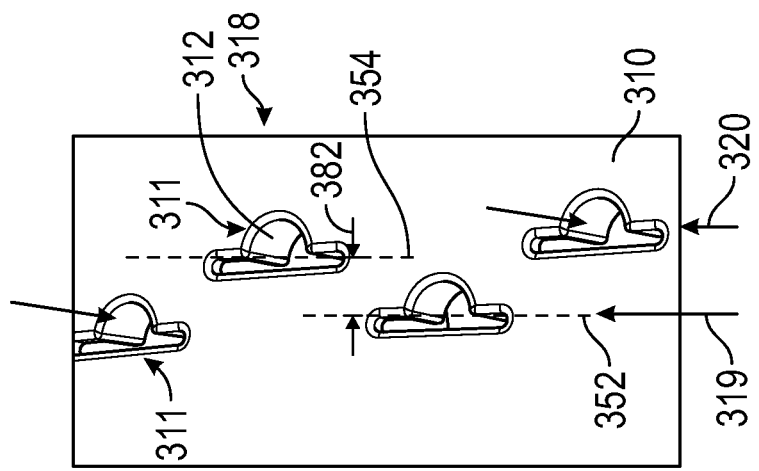
FIG. 8 shows a schematic, partial, top perspective view of a dilution passage of a liner for a combustor, according to an embodiment of the present disclosure.

In the example of FIG. 8, the dilution array 318 may include the plurality of dilution passages 311 arranged in a staggered array. In this manner, the dilution array 318 may include a first row 319 and a second row 320. The first row 319 may be axially offset rom the second row 320. For example, a first centerline 352 of a dilution passage 311 in the first row 319 and a second centerline 354 of a dilution passage 311 in the second row 320 may be an axial offset 382. A length of the axial offset 382 may be within a range of zero to (+/−)five times the diameter of the discrete hole 312. The integrated dilution holes on outer and inner liners are either opposed or staggered circumferentially relative to each other. Although a single dilution array 318 having the first row 319 and the second row 320 is shown, the array may be repeated along the axial length of the liner 310 such that a plurality of first rows 319 and second rows 320 are present.

Any of the examples of FIGS. 6A to 8 may be combined with any or all of the examples of FIGS. 6A to 8.

Figure 9:
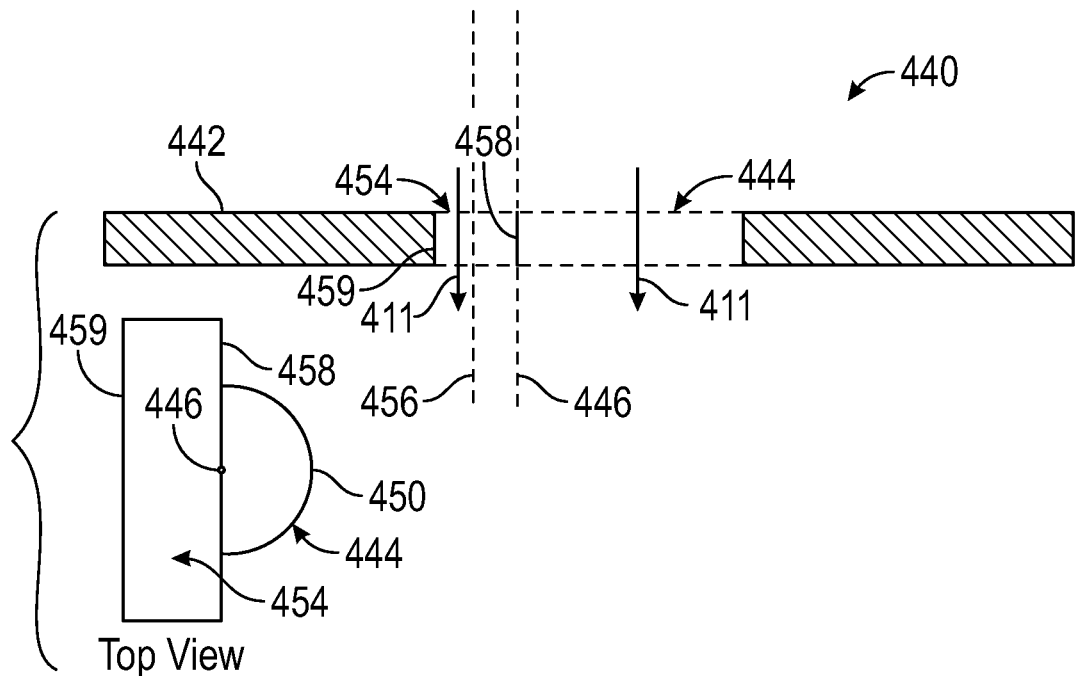
FIG. 9 shows a schematic side cross-sectional view of a dilution passage of a combustion liner, according to an embodiment of the present disclosure.

FIG. 9 shows a schematic side cross-sectional view of a dilution passage 411 of a combustion liner 442. The combustion liner 442 may be the same as or similar to the combustion liner of FIG. 2. Referring to FIG. 9, a side view 440 schematically represents the dilution passage 411, which may be similar to the dilution passage 411 of FIG. 2. The dilution passage 411 extends through the combustion liner 442 of a combustor. The combustion liner 442 may be an inner liner or an outer liner of the combustion chamber. The dilution passage 411 has a geometry that is formed by concatenating a series of discrete dilution holes 444 and a discrete dilution slot 454. Each discrete dilution hole 444 may be semicircular in cross section. For example, in a top view of the discrete dilution holes 444, a geometry 450 of the discrete dilution holes 444 may be semicircular. A centerline of the circle formed by two halves of the semi-circle may be a centerline 446 of each of the discrete dilution holes 444. That is, an axis extending through the center of the diameter of the discrete dilution holes 444 aligns with the centerline 446. The discrete dilution slot 454 may have a forward face 458 and an aft face 459.

With continued reference to FIG. 9, the centerlines 446 of the discrete dilution holes 444 are parallel to a centerline 456 of the discrete dilution slot 454. The forward face 458 of the discrete dilution slot 454 merges and aligns with each of the diameters of the discrete dilution holes 444, which may have a semicircular geometry. Thus, the centerlines 446 of the discrete dilution holes 444 are in line with the forward face 458 of the discrete dilution slot 454 at the axial location of the forward face 458 of the discrete dilution slot 454, such as shown in the top view. Further, ten percent to ninety percent of a total flow area of the dilution passage 411 is occupied by the discrete dilution holes 444 and the rest of the total flow area is occupied by the discrete dilution slot 454.

Figure 10:
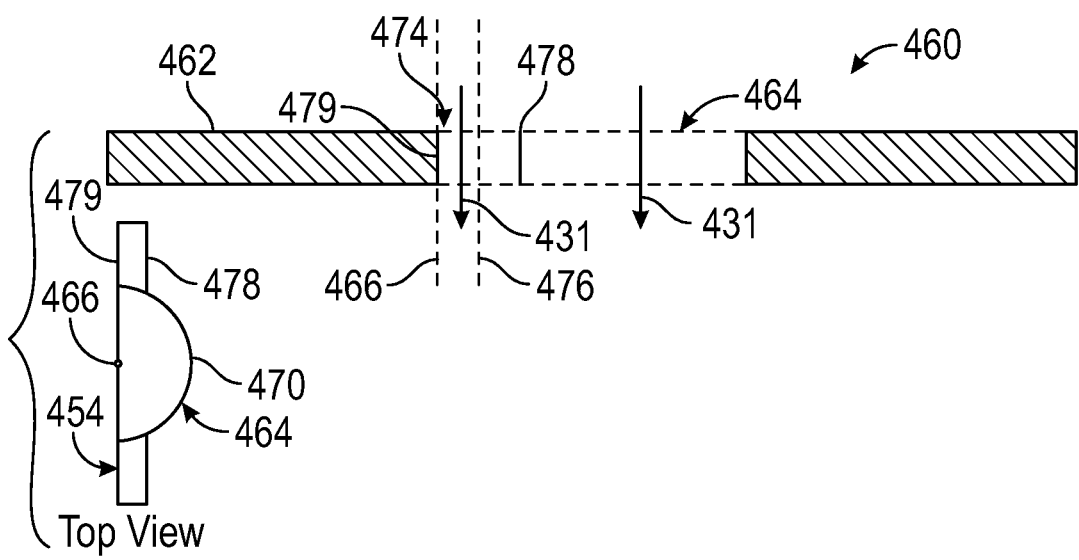
FIG. 10 shows a schematic side cross-sectional view of a dilution passage of a combustion liner, according to an embodiment of the present disclosure.

FIG. 10 shows a schematic side view cross-sectional of a dilution passage 431 of a combustion liner 462. The combustion liner 462 may be the same as or similar to the combustion liner of FIG. 2. Referring to FIG. 10, a side view 460 schematically represents the dilution passage 431, which may be similar to the dilution passage 211 of FIG. 2. The dilution passage 431 extends through the combustion liner 462 of a combustor. The dilution passage 411 has a geometry that is formed by concatenating a series of discrete dilution holes 464 and a discrete dilution slot 474. Each discrete dilution hole 464 may be semicircular in cross section. For example, in a top view of the discrete dilution holes 464, a geometry 470 of the discrete dilution holes 464 may be semicircular. A centerline of the circle formed by two halves of the semi-circle may be a centerline 466 of each of the discrete dilution holes 464. That is, an axis extending through the center of the diameter of the discrete dilution hole 464 aligns with the centerline 466. The discrete dilution slot 474 may have a forward face 478 and an aft face 479.

With continued reference to FIG. 10, the centerlines 466 of the discrete dilution holes 464 are parallel to a centerline 476 of the discrete dilution slot 474. Further, the centerlines 466 of the discrete dilution holes 464 are in line with the aft face 479 of the discrete dilution slot 474 at the axial location of the aft face 479 of the discrete dilution slot 474.

Figure 11:
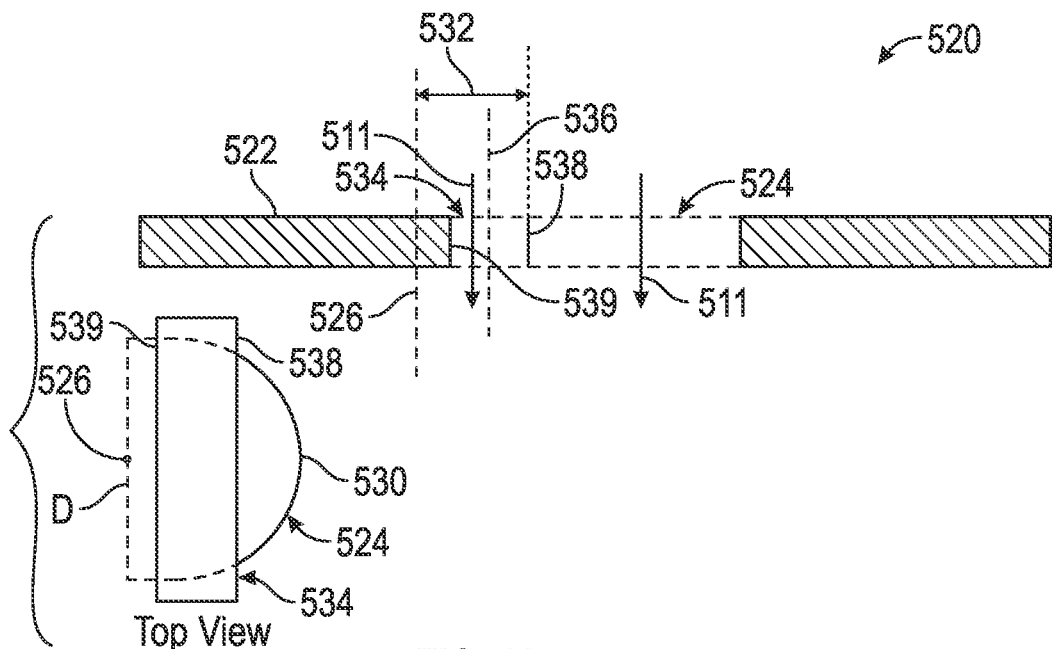
FIG. 11 shows a schematic side cross-sectional view of a dilution passage of a combustion liner, according to an embodiment of the present disclosure.

FIG. 11 shows a schematic side cross-sectional view of a dilution passage 511 of a combustion liner 522. The combustion liner 522 may be the same as or similar to the combustion liner of FIG. 2. Referring to FIG. 11, a side view 520 schematically represents the dilution passage 511, which may be similar to the dilution passage 211 of FIG. 2. The dilution passage 511 extends through the combustion liner 522 of a combustor. The dilution passage 511 has a geometry that is formed by concatenating a series of discrete dilution holes 524 and a discrete dilution slot 534. Each discrete dilution hole 524 may be semicircular in cross section. For example, in a top view of the discrete dilution hole 524, a geometry 530 of the discrete dilution hole 524 may be semicircular. A centerline of the circle formed by two halves of the semi-circle may be a centerline 526 of each of the discrete dilution hole 524. That is, an axis extending through the center of the diameter of the discrete dilution hole 524 aligns with the centerline 526. The discrete dilution slot 534 may have a forward face 538 and an aft face 539.

With continued reference to FIG. 11, the centerlines 526 of the discrete dilution holes 524 are parallel to a centerline 536 of the discrete dilution slot 534. Further, the centerlines 526 of the discrete dilution holes 524 are aft of the aft face 539 of the discrete dilution slot 534 at the axial location of the aft face 539 of the discrete dilution slot 534. An offset 532, measured between the centerlines 526 of the discrete dilution holes 524 and the forward face 538 of the discrete dilution slot 534 is between zero to 0.3 times the diameter D of the discrete dilution holes 524.

Figure 12:
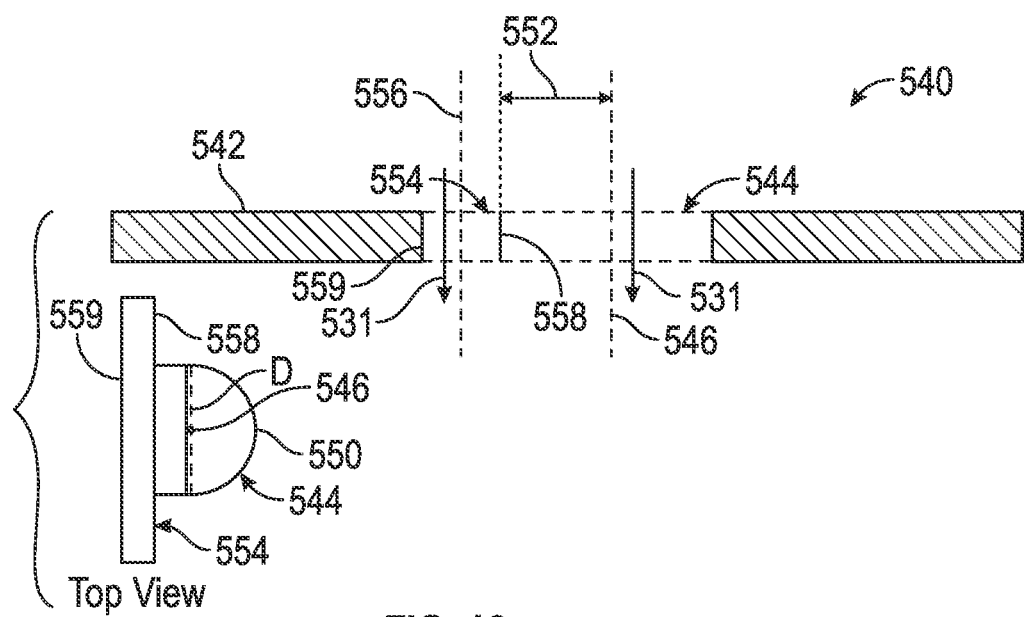
FIG. 12 shows a schematic side cross-sectional view of a dilution passage of a combustion liner, according to an embodiment of the present disclosure.

FIG. 12 shows a schematic side cross-sectional view of a dilution passage 531 of a combustion liner 542. The combustion liner 542 may be the same as or similar to the combustion liner of FIG. 2. Referring to FIG. 12, a side view 540 schematically represents the dilution passage 531, which may be similar to the dilution passage 211 of FIG. 2. The dilution passage 531 extends through the combustion liner 542 of a combustor. The dilution passage 531 has a geometry that is formed by concatenating a series of discrete dilution holes 544 and a discrete dilution slot 554. Each discrete dilution hole 544 may be semicircular in cross section. For example, in a top view of the discrete dilution hole 544, a geometry 550 of the discrete dilution hole 544 may be semicircular. A centerline of the circle formed by two halves of the semi-circle may be a centerline 546 of each of the discrete dilution holes 524. That is, an axis extending through the center of the diameter of the discrete dilution hole 544 aligns with the centerline 546. The discrete dilution slot 554 may have a forward face 558 and an aft face 559.

With continued reference to FIG. 12, the centerlines 546 of the discrete dilution holes 544 are parallel to a centerline 556 of the discrete dilution slot 554. Further, the centerlines 546 of the discrete dilution holes 544 are forward of the forward face 558 of the discrete dilution slot 534 at the axial location of the forward face 558 of the discrete dilution slot 554. An offset 552, measured between the centerlines 546 of the discrete dilution holes 544 and the forward face 558 of the discrete dilution slot 534 is between zero to one time the diameter D of the discrete dilution holes 544.

Figure 13:
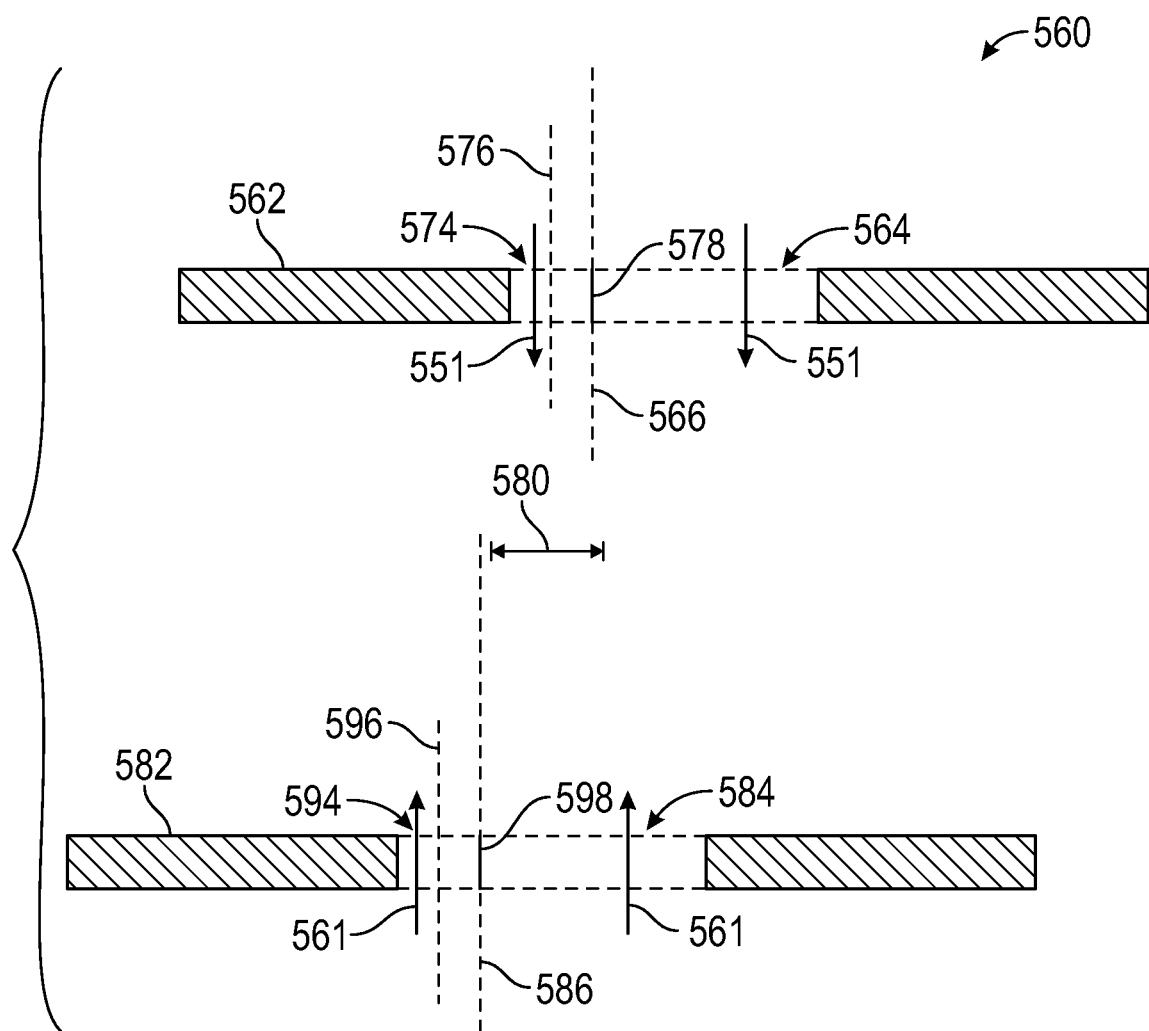
FIG. 13 shows a schematic side cross-sectional view of the dilution passages through an outer liner and an inner liner of a combustor, according to an embodiment of the present disclosure.

FIG. 13 shows a schematic side cross-sectional view 560 of a first dilution passage 551 through an outer liner 562 and a second dilution passage 561 through an inner liner 582 of a combustor, according to an embodiment of the present disclosure. The first dilution passage 551 has a geometry that is formed by concatenating a series of discrete dilution holes 564 and a discrete dilution slot 574. Centerlines 566 of the discrete dilution holes 564 are parallel with a centerline 576 of the discrete dilution slot 574 and in line with a forward face 578 of the discrete dilution slot 574 at the axial location of the forward face 578 of the discrete dilution slot 574. The second dilution passage 561 has a geometry that is formed by concatenating a series of discrete dilution holes 584 and a discrete dilution slot 594. Centerlines 586 of the discrete dilution holes 584 are parallel with a centerline 596 of the discrete dilution slot 594 and in line with a forward face 598 of the discrete dilution slot 594 at the axial location of the forward face 598 of the discrete dilution slot 594. An offset 580, measured between the centerlines 566 of the discrete dilution holes 564 on the outer liner 562 and the centerlines 586 of the discrete dilution holes 584 on the inner liner 582, is between zero to +/−six times a diameter of the discrete dilution holes 564 or 584.

Figure 14:
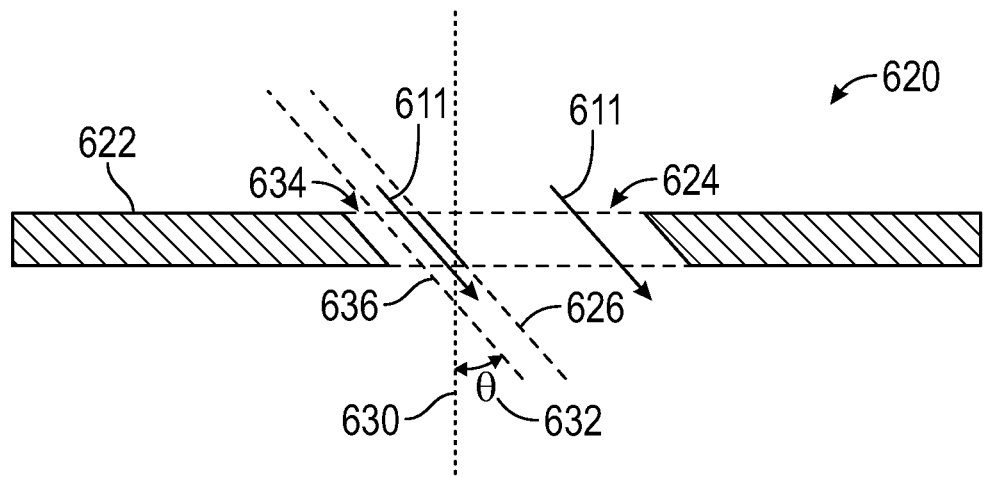
FIG. 14 shows a schematic side cross-sectional view of the dilution passage of the liner of FIG. 2, according to an embodiment of the present disclosure.

FIG. 14 shows a schematic side cross-sectional view 620 of a dilution passage 611 of a combustion liner 622. The dilution passage 611 has a geometry that is formed by concatenating a series of discrete dilution holes 624 and a discrete dilution slot 634. Centerlines 626 of the discrete dilution holes 624 are parallel to a centerline 636 of the discrete dilution slot 634. The centerlines 626 of the discrete dilution holes 624 and/or the centerline 636 of the discrete dilution slot 634, that is, the flow direction of the discrete hole and discrete slot flows, may be inclined at an angle theta 632, defined with respect to an axis 630 normal to the combustion liner 622. The angle theta may be from minus sixty degrees (inclined forward) to positive sixty degrees (inclined aft). Centerlines 626 of the discrete dilution holes 624 may be normal to the combustion liner 622 and centerline 636 of the discrete dilution slot 634 inclined at the theta angle and vice versa. Although shown as being aligned with the centerline 636, the centerlines 626 may be offset in any of the previously described manners with respect to the description of FIGS. 9 to 13.

Figure 15:
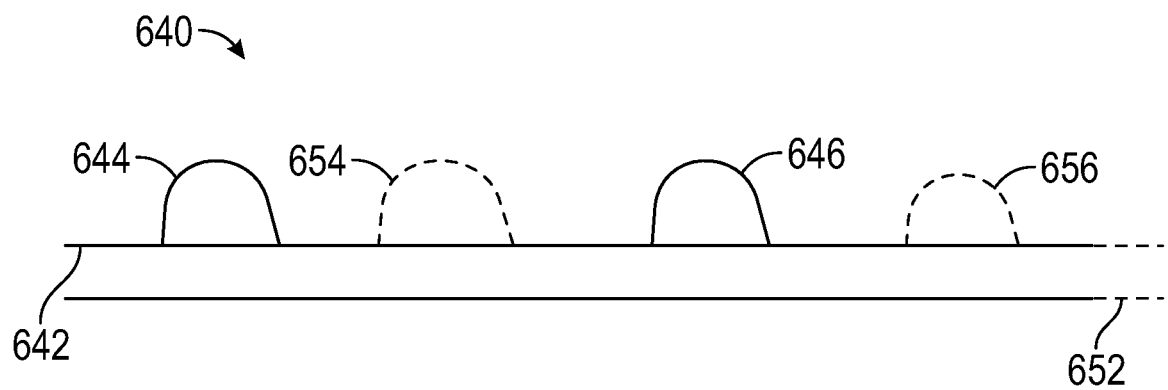
FIG. 15 shows a schematic top view of the dilution passages of an exemplary inner liner and outer liner of a combustor, according to an embodiment of the present disclosure.
Figure 16:
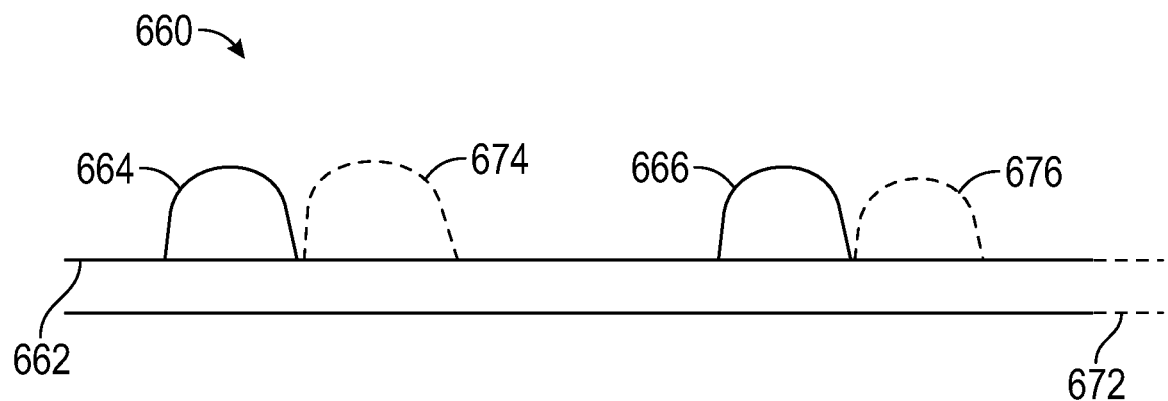
FIG. 16 shows schematic top view of the dilution passages of an exemplary inner liner and outer liner of a combustor, according to an embodiment of the present disclosure.

FIGS. 15 and 16 each shows a schematic top view of the dilution passages of exemplary inner liner and outer liner of a combustor, such as combustor 112 (FIG. 1), according to an embodiment of the present disclosure. A schematic outline of the dilution holes of an outer liner are shown overlain on the dilution holes of an inner liner. That is, when viewing the liner from a top view, the outline of the dilution holes of the inner liner and outer liner may appear as shown in either of FIG. 15 or 16.

For example, FIG. 15 shows a top view 640 of an outer liner 642 and an inner liner 652. The outer liner 642 has a series of outer liner discrete dilution holes including an outer liner discrete dilution hole 644 and an outer liner discrete dilution hole 646. Although two outer liner discrete dilution holes are shown, more may be provided. The inner liner 652 has a series of inner liner discrete dilution holes including an inner liner discrete dilution hole 654 and an inner liner discrete dilution hole 656. Although two inner liner discrete dilution holes are show, more may be provided.

The outer liner discrete dilution hole 644 and the outer liner discrete dilution hole 646 may directly oppose or may be angularly staggered with the inner liner discrete dilution hole 654 and the inner liner discrete dilution hole 656. In this manner, when the series of outer liner discrete dilution holes and inner liner discrete dilution holes are axially aligned, the inner liner discrete dilution hole 654 is circumferentially between the outer liner discrete dilution hole 644 and the outer liner discrete dilution hole 646. The inner liner discrete dilution hole 656 may be located between the outer liner discrete dilution hole 646 and a not shown, adjacent outer liner discrete dilution hole. Each of the inner liner discrete dilution holes may be halfway between adjacent outer liner discrete dilution holes.

Although shown and described as being staggered halfway, other offsets between the outer liner discrete dilution holes 644 and 646 and the inner liner discrete dilution holes 654 and 656 are contemplated. For example, FIG. 16, a top view 660 of an outer liner 662 and an inner liner 672. The outer liner 662 has a series of outer liner discrete dilution holes including an outer liner discrete dilution hole 664 and an outer liner discrete dilution hole 666. Although two outer liner discrete dilution holes are shown, more may be provided. The inner liner 672 has a series of inner liner discrete dilution holes including an inner liner discrete dilution hole 674 and an inner liner discrete dilution hole 676. Although two inner liner discrete dilution holes are show, more may be provided. The top liners of FIG. 16 may be the same as the liners of FIG. 15, however, the inner liner discrete dilution hole 674 and the inner liner discrete dilution hole 676 may be positioned circumferentially closer to the outer liner discrete dilution hole 664 and the outer liner discrete dilution hole 666, respectively, as compared to FIG. 15. That is, a distance between an inner liner discrete dilution hole, such as inner liner discrete dilution hole 674 and a first outer liner discrete dilution hole, such as the outer liner discrete dilution hole 664, may be smaller than a distance between the same inner liner discrete dilution hole (e.g., inner liner discrete dilution hole 674) and an outer liner discrete dilution hole adjacent to the first outer liner discrete dilution hole (e.g., outer liner discrete dilution hole 666). This relationship may be reversed and any distance between the dilution holes may be provided.

There may be other positional locations of the inner liner discrete dilution holes with respect to the outer liner discrete dilution holes in addition to, or as alternatives to, the two positions mentioned above. Further, outer liner discrete holes may be in line with a center of a swirler or at an angle with respect to the swirler. The angle may depend on the number of discrete holes per swirler cup liner.

Figure 17:
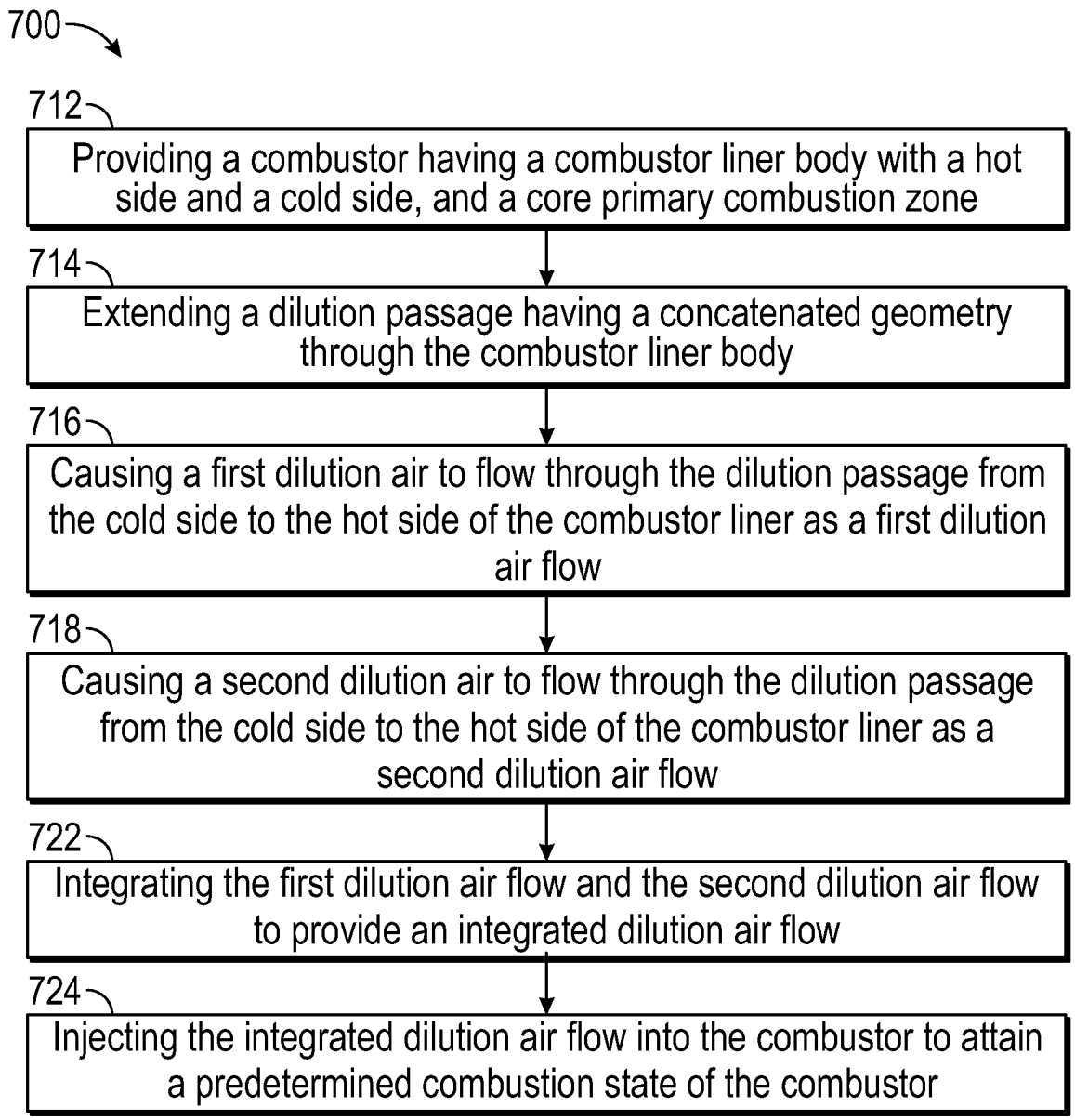
FIG. 17 shows a schematic flow diagram of a method of causing a dilution flow through a combustor liner of a combustor, according to an embodiment of the present disclosure.

FIG. 17 shows a schematic flow diagram of a method 700 of causing a dilution flow through a combustor liner, according to an embodiment of the present disclosure. The method 700 includes providing a combustor having (i) a combustor liner body with a hot side and a cold side, and (ii) a core primary combustion zone of the combustor, as shown in step 712. The method 700 also includes extending a dilution passage having a concatenated geometry through the combustor liner body, as shown in step 714. The method 700 further includes causing a first dilution air to flow through the dilution passage from the cold side to the hot side of the combustor liner, as shown in step 716. The method also includes causing a second dilution air to flow through the dilution passage from the cold side to the hot side of the combustor liner, as shown in step 718.

The concatenated geometry of the dilution passage is formed by concatenating a first geometry and a second geometry at a predetermined relative position such that the first dilution air and the second dilution air are integrated within the combined geometry of the dilution passage. The first geometry can be positioned forward or upstream with the second geometry positioned aft or downstream. The second geometry can be positioned forward or upstream with the first geometry positioned aft or downstream.

The first geometry includes at least one discrete hole and the second geometry includes at least one discrete dilution slot. The size of the discrete features such as the holes and the discrete slots, discretely positioned, can be varied circumferentially or can have a particular pattern along the circumference. The discrete holes can have a semi-circular cross section, or a triangular cross section, or a semi-elliptical cross section with a major axis in a lateral direction, or a semi-elliptical cross section with a major axis in an axial direction, or any combination thereof.

The concatenated geometry of the dilution passage can repeat in a predetermined pattern such as in a linear array substantially circumferential with respect to the combustor, or in a staggered array. The dilution passages can be oriented in a varying angle of predetermined orientation in relation to the combustor. The dilution passages can be arranged normal to an axis of the liner, or the dilution passages can be inclined at an angle to the axis of the swirler.

The method 700 further includes providing a third geometry and concatenating the third geometry with the first geometry such that the first dilution air flows through the third geometry. The third geometry is a protruding dilution insert extending into the hot side of the liner. The protruding dilution insert can be a full-length insert, or an angled-cut (or slant cut) dilution insert, or a fence. The length of the protruding dilution inserts can be more on one side than on another such that weighted areas reduce from one side to other. The exact dimensions of the protruding dilution inserts can be adjusted for effective performance.

The method 700 further includes integrating the first dilution air flow and the second dilution air flow to provide an integrated dilution air flow to increase mixing with a number of combustion products in a primary combustion zone of the combustor, as shown in step 722. The method 700 also includes injecting the integrated dilution air flow into the combustor to attain a predetermined combustion state of the combustor, as shown in step 724.

The predetermined combustion state of the combustor includes a compliant $NO_x$ emission level. The predetermined combustion state of the combustor further includes reducing a temperature in a core primary combustion zone of the combustor. The predetermined combustion state of the combustor further includes a reduced temperature in a core primary combustion zone of the combustor. The predetermined combustion state of the combustor further includes reducing a temperature in a wake region of the dilution jet or dilution insert. The predetermined combustion state of the combustor further includes reducing a temperature between dilution jets or a dilution insert. The predetermined combustion state of the combustor also includes a uniform temperature distribution within a primary and secondary combustion zone of the combustor. The predetermined combustion state of the combustor includes a combustor exit temperature profile conforming with a reference temperature profile. The predetermined combustion state of the combustor also includes rapid quenching and a quick and an increased mixing of the first dilution air flow and the second dilution air flow with combustion products in a primary combustion zone of the combustor. Further, the predetermined combustion state of the combustor includes a balance of a predetermined air split ratio (relative distribution or share) of the first dilution air flow and the second dilution air flow.

The liner for a gas turbine engine combustor of the present disclosure provides a dilution passage with a concatenated geometry that integrates a first dilution air flow and a second dilution air flow into an integrated dilution air flow.

When the second dilution air flow is downstream of the first dilution air flow, the second dilution air flow may provide a hydraulic support to the first dilution air flow. When the second dilution air flow is upstream of the first dilution air flow, the second dilution air flow may provide a hydraulic shield for the first dilution air flow. In both cases, the hydraulic support and/or hydraulic shielding may percolate between the discrete jets of the first dilution air flow and enhance a penetration of the first dilution air flow into a core primary combustion zone of the combustor.

The integrated dilution air flow increases rapid quenching and mixing of the dilution air flows with a number of combustion products in a primary combustion zone of the combustor leading to a uniform temperature distribution within the primary combustion zone of the combustor and a combustor exit temperature profile conforming with a reference temperature profile. The integrated dilution air flow reduces an emission level of nitrogen oxides ($NO_x$) in a core primary combustion zone of the combustor in compliance with regulatory guidelines.

Further aspects of the present disclosure are provided by the subject matter of the following clauses.

A liner for a combustor in a gas turbine engine. The liner body has a liner body having a cold side and a hot side, and a dilution array having a plurality of dilution passages. Each dilution passage of the plurality of dilution passages comprising a concatenated geometry repeating in a predetermined pattern and extending circumferentially around the liner body. The dilution passage is configured (i) to integrate a first dilution air flow flowing through the dilution passage from the cold side to the hot side and a second dilution air flow flowing through the dilution passage from the cold side to the hot side into an integrated dilution air flow, and (ii) to inject the integrated dilution air flow into a core primary combustion zone of the combustor to attain a predetermined combustion state of the combustor. The dilution array is repeated along an axial length of the liner body.

The liner of the preceding clause, wherein the second dilution air flow fills a region of wakes formed behind a plurality of discrete jets of the first dilution air flow.

The liner of any preceding clause, wherein the first dilution air flow is ten percent to ninety percent of a total flow through the plurality of dilution passages.

The liner of any preceding clause, wherein the first dilution air flow is located axially aft of the second dilution air flow.

The liner of any preceding clause, wherein the first dilution air flow is located axially forward of the second dilution air flow.

The liner of any preceding clause, wherein each of the plurality of dilution passages comprises a discrete slot and a discrete hole.

The liner of any preceding clause, wherein the discrete slot has a first slot extension extending circumferentially in a first direction from a first side of the discrete hole and a second slot extension extending circumferentially in a second direction from a second side of the discrete hole, wherein the first direction opposes the second direction.

The liner of any preceding clause, wherein the first slot extension and the second slot extension are each within a range of 0.5 times to fifteen times a slot width of the discrete slot.

The liner of any preceding clause, wherein each of the plurality of dilution passages comprises a dilution insert extending radially inward toward a centerline of the combustor from the hot side of the liner body.

The liner of any preceding clause, wherein the dilution insert has a constant height from a forward side of the dilution insert to an aft side of the dilution insert.

The liner of any preceding clause, wherein the dilution insert has a variable height from a forward side of the dilution insert to an aft side of the dilution insert.

The liner of any preceding clause, wherein each of the plurality of dilution passages further comprises a discrete slot and a discrete hole, and the dilution insert has a height within a range of 0.1 times to ten times a diameter of the discrete hole.

The liner of any preceding clause, wherein the dilution insert has a slant cut along a forward side of the dilution insert.

The liner of any preceding clause, wherein the concatenated geometry comprises at least a first geometry and a second geometry concatenated at a predetermined relative position and wherein the first dilution air flow flows through the first geometry and the second dilution air flow flows through the second geometry.

The liner of any preceding clause, wherein the first geometry comprises a discrete hole having a semi-circular cross section.

The liner of any preceding clause, wherein the first geometry comprises at least one discrete hole and the second geometry comprises at least one discrete slot.

The liner of any preceding clause, wherein the predetermined pattern is a linear array.

The liner of any preceding clause, wherein the linear array comprises the plurality of dilution passages arranged along a common axis around a circumference of the liner body.

The liner of any preceding clause, wherein the predetermined pattern comprises a staggered array.

The liner of any preceding clause, wherein the staggered array comprises a first row of the plurality of dilution passages and a second row of the plurality of dilution passages, a centerline of the plurality of dilution passages in the first row being axially offset from a centerline of the plurality of dilution passages in the second row.

Although the foregoing description is directed to the preferred embodiments, it is noted that other variations and modifications will be apparent to those skilled in the art, and may be made without departing from the spirit or scope of the disclosure Moreover, features described in connection with one embodiment may be used in conjunction with other embodiments, even if not explicitly stated above.

The invention claimed is:

1. A liner for a combustor in a gas turbine engine, the liner comprising:
   a liner body having a cold side and a hot side; and
   a dilution array comprising a plurality of dilution passages repeating in a predetermined pattern circumferentially around the liner body, each dilution passage of the plurality of dilution passages having a concatenated geometry comprising:
      a discrete hole configured to inject a first dilution air flow therethrough from the cold side to the hot side; and
      a discrete slot configured to inject a second dilution air flow therethrough from the cold side to the hot side, wherein the discrete hole is located downstream of the discrete slot such that the discrete hole is configured to inject the first dilution air flow downstream of a location at which the discrete slot is configured to inject the second dilution air flow,
   wherein the dilution array is configured (i) to integrate the first dilution air flow and the second dilution air flow into an integrated dilution air flow, and (ii) to inject the integrated dilution air flow into a core primary combustion zone of the combustor to attain a predetermined combustion state of the combustor,
wherein the dilution array is repeated along an axial length of the liner body,
wherein the discrete hole has a semi-circular cross section and a centerline extending through a center of a diameter of the semi-circular cross section, and
wherein a forward face of the discrete slot is coextensive with a plane parallel to the forward face and extends through the centerline of the discrete hole.

2. The liner of claim 1, wherein the first dilution air flow is ten percent to ninety percent of a total flow through the plurality of dilution passages.

3. The liner of claim 1, wherein the discrete slot has a first slot extension extending circumferentially in a first direction from a first side of the discrete hole and a second slot extension extending circumferentially in a second direction from a second side of the discrete hole, wherein the first direction opposes the second direction.

4. The liner of claim 3, wherein the first slot extension and the second slot extension are each within a range of 0.5 times to fifteen times a slot width of the discrete slot.

5. The liner of claim 1, wherein each of the plurality of dilution passages comprises a dilution insert extending radially inward from the hot side of the liner body.

6. The liner of claim 5, wherein the dilution insert has a constant height from a forward side of the dilution insert to an aft side of the dilution insert.

7. The liner of claim 5, wherein the dilution insert has a variable height from a forward side of the dilution insert to an aft side of the dilution insert.

8. The liner of claim 5, wherein the dilution insert has a height within a range of 0.1 times to ten times the diameter of the discrete hole.

9. The liner of claim 5, wherein the dilution insert has a slant cut along a forward side of the dilution insert.

10. The liner of claim 1, wherein the predetermined pattern is a linear array.

11. The liner of claim 10, wherein the linear array comprises the plurality of dilution passages arranged along a common axis around a circumference of the liner body.

12. The liner of claim 1, wherein the predetermined pattern comprises a staggered array.

13. The liner of claim 12, wherein the staggered array comprises a first row of the plurality of dilution passages and a second row of the plurality of dilution passages, a centerline of the plurality of dilution passages in the first row being axially offset from a centerline of the plurality of dilution passages in the second row.

14. A liner for a combustor in a gas turbine engine, the liner comprising:

a liner body having a cold side and a hot side; and
a dilution array comprising a plurality of dilution passages repeating in a predetermined pattern circumferentially around the liner body, each dilution passage of the plurality of dilution passages having a concatenated geometry comprising:
a discrete hole having a semi-circular cross section with a centerline extending through a center of a diameter of the semi-circular cross section, the discrete hole configured to inject a first dilution air flow therethrough from the cold side to the hot side; and
a discrete slot configured to inject a second dilution air flow therethrough from the cold side to the hot side, wherein the discrete slot is located downstream of the discrete hole such that the discrete slot is configured to inject the second dilution air flow downstream of a location at which the discrete hole is configured to inject the first dilution air flow and wherein an aft face of the discrete slot is coextensive with a plane parallel to the aft face and extends through the centerline of the discrete hole,
wherein the dilution array is configured (i) to integrate the first dilution air flow and the second dilution air flow into an integrated dilution air flow, and (ii) to inject the integrated dilution air flow into a core primary combustion zone of the combustor to attain a predetermined combustion state of the combustor, and
wherein the dilution array is repeated along an axial length of the liner body.

15. The liner of claim 14, wherein the second dilution air flow fills a region of wakes formed behind a plurality of discrete jets of the first dilution air flow.

16. The liner of claim 14, wherein the first dilution air flow is ten percent to ninety percent of a total flow through the plurality of dilution passages.

17. The liner of claim 14, wherein the discrete slot has a first slot extension extending circumferentially in a first direction from a first side of the discrete hole and a second slot extension extending circumferentially in a second direction from a second side of the discrete hole, wherein the first direction opposes the second direction.

18. The liner of claim 14, wherein each of the plurality of dilution passages comprises a dilution insert extending radially inward from the hot side of the liner body.

19. The liner of claim 14, wherein the predetermined pattern is a linear array.

20. The liner of claim 14, wherein the predetermined pattern comprises a staggered array.

* * * * *